Patented Aug. 3, 1948

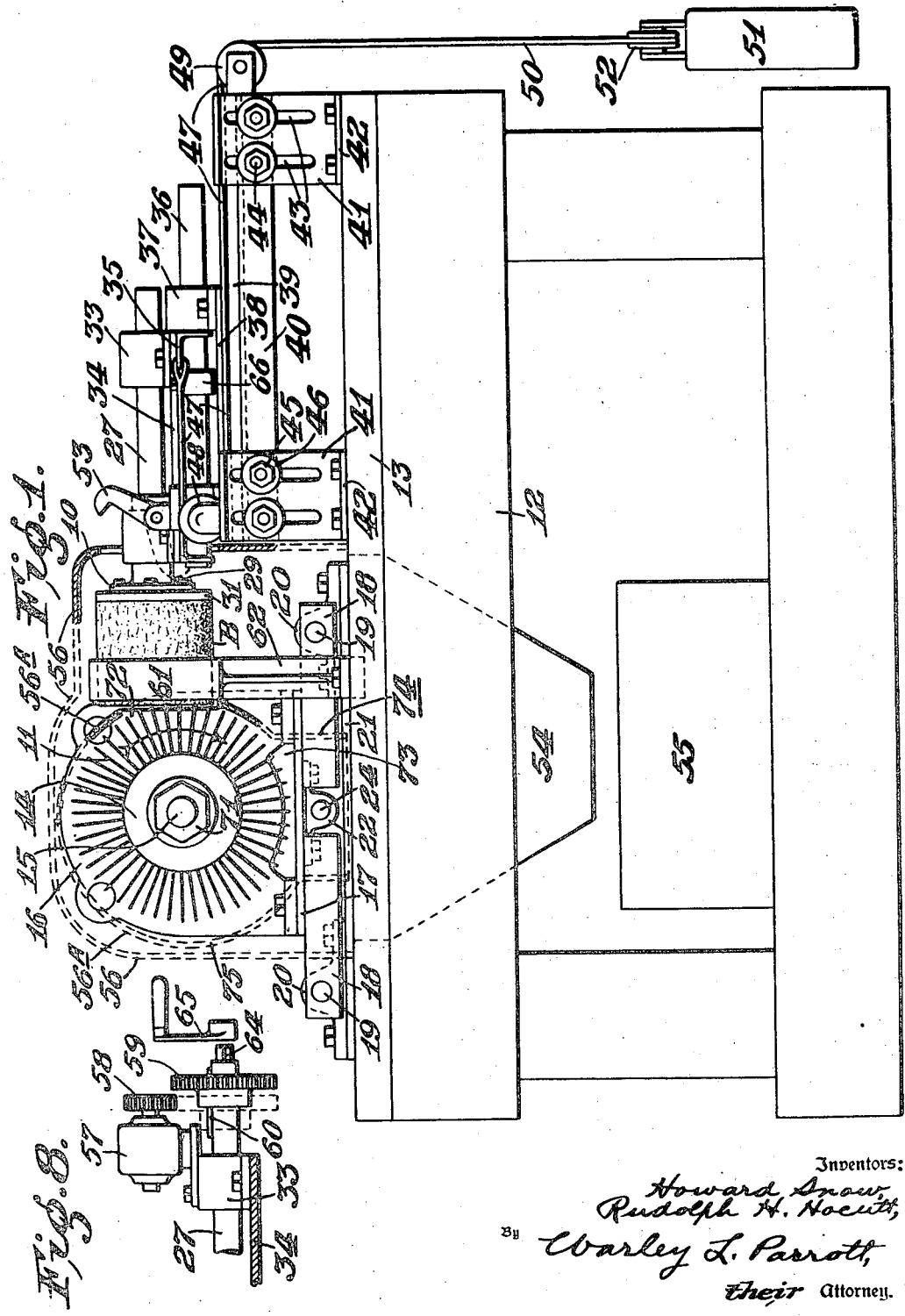

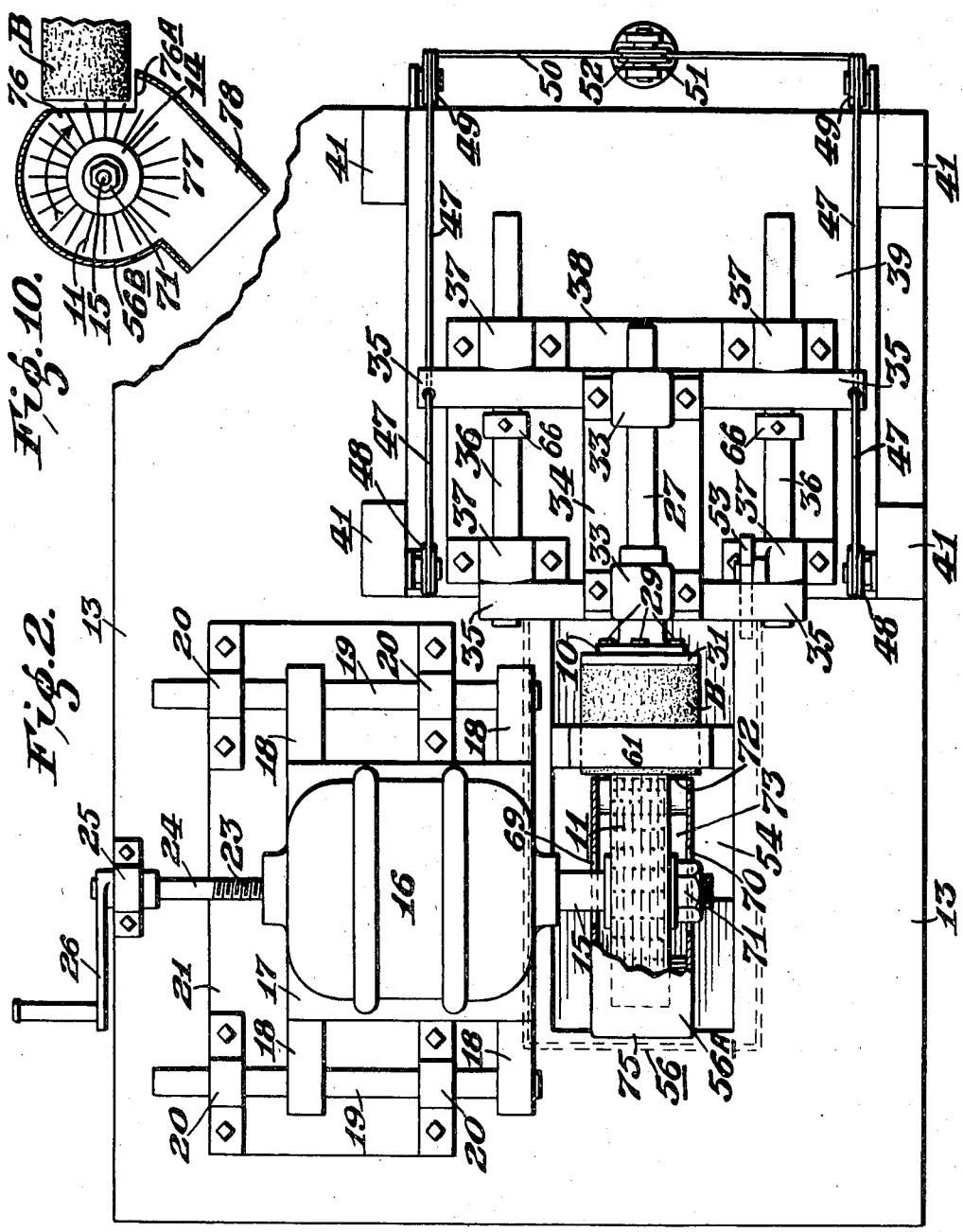

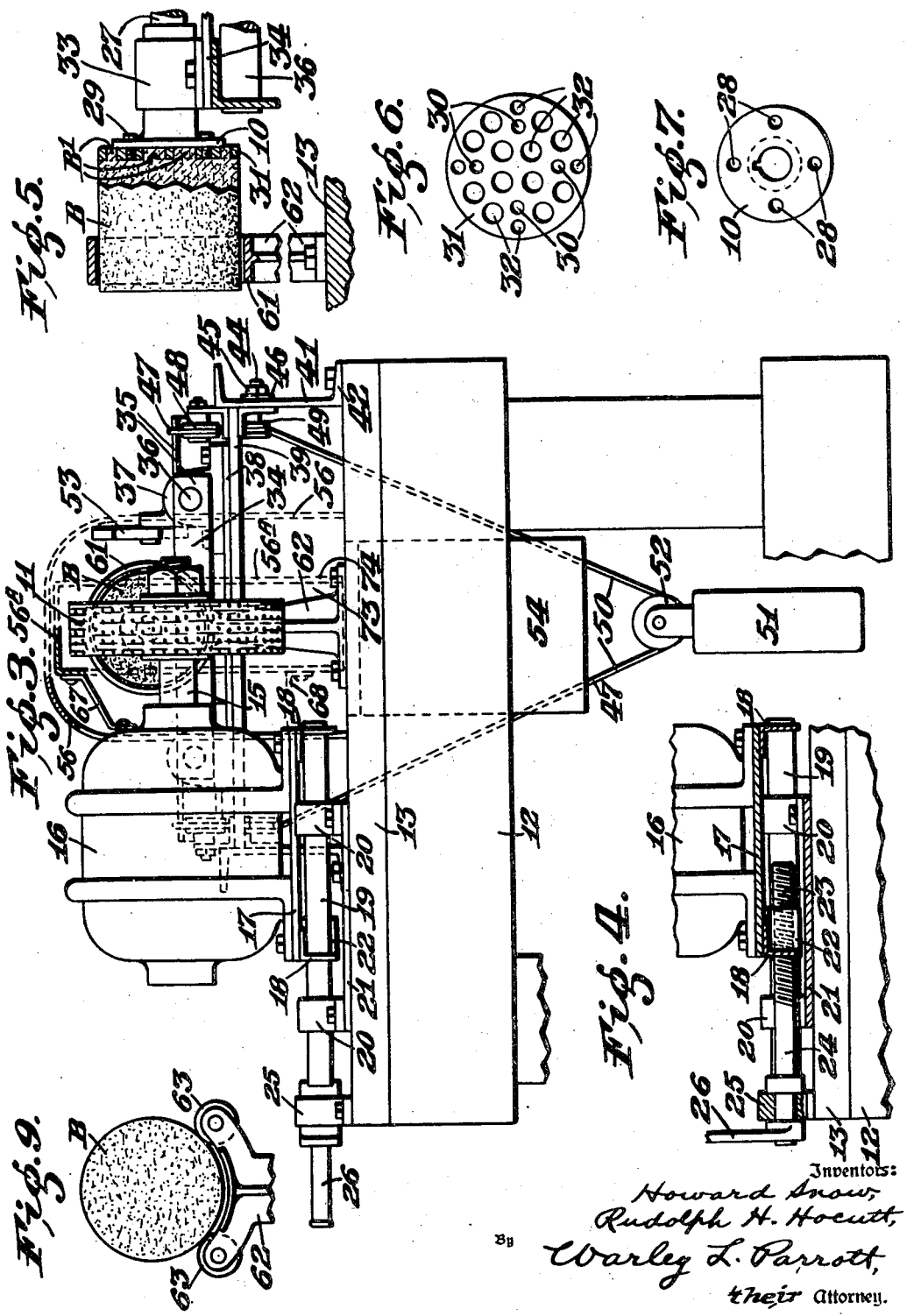

2,446,345

UNITED STATES PATENT OFFICE 2,446,345

MEANS FOR PREPARING FIBROUS MOLDING COMPOSITIONS

Howard Snow and Rudolph H. Hocutt, Charlotte, N. C., assignors to Southern Friction Materials Company, a corporation of North Carolina Application July 27, 1943, Serial No. 496,356

6 Claims. (Cl. 19—65)

This invention relates to molding compositions and more particularly to means and methods for preparing coated, discrete fibers capable of being molded under pressure into a compact product, with an interlocking and bonding of the fibers to give great tensile strength, durability and other desirable physical qualities. The molded product is adaptable for various commercial uses, e. g., brake linings, substitutes for leather, and construction materials.

An object of the invention is to make practical and successful the use of low grade or waste fibers, such as cotton motes, short vegetable or animal fibers, lint, flock, scraps of yarn or cloth, and the like.

The method of our invention includes a reclamation and coating of the fibers with a bonding medium, such as, for example, rubber, drying oil, thermosetting resin, varnish, or an equivalent or other suitable material; then preforming the coated fibers into a compact solid mass or billet, and thereafter disintegrating the solid preform into discrete fibrous particles or shreds that are each and all coated with the bonding material such as to permit uniform aging of each and every fiber, and reforming the same into a compressed product.

One of the principal features of our invention is the means or apparatus for defiberizing the preform of coated fibers mentioned above. This apparatus is so constructed and operated that it separates the preform into individual, discrete fibers, without any substantial cutting or shortening of the fibers, whereby the maximum strength of the fibers for use in molded products is preserved. The apparatus comprises a supporting element on which the preform is held and a rotatable and transversely movable brush for separating or defiberizing the preform into discrete fibers.

An illustrative but non-limiting example of our method of preparing the fibers and the preform and defiberizing the preform is as follows:

The first step of the method is to disintegrate into loose bulk, cloth or any of the other fibrous waste materials mentioned above, by running the same through a suitable disintegrator, e. g., a hammer mill, so that the resultant discrete fibers are of individual lengths between approximately $1/64$ inch to $1/2$ inch. In some uses, where substantially exact uniformity in fiber size is required, the disintegrated material from the hammer mill is screened or otherwise separated and graded in an approved manner.

The second step is to coat the fibers with an organic binder material and solvent in a suitable mixer, e. g., one of the conventional sigma-blade type or the equivalent.

The third step is to evaporate the solvent from the coating by allowing the coated fibers to air-dry for a period of approximately twelve hours.

The fourth step is to form the air-dried fibers into a solid pressed body, usually a cylindrical billet, produced in a mold under pressure of a piston. This makes a solid preform in which the bonding material is compacted uniformly on all of the fibers in the body.

The next or fifth step is to defiberize the preform to discrete, coated, fibers by subjecting it to the action of our above described defiberizing apparatus.

After the coated fibers are thus separated they are aged for some time in space at room temperature for oxidation and to get past stickiness, so that the coated fibers are capable of being fluffed and made freely flowable for feeding to a press in which they are compacted into the reformed body for ultimate use.

After the aging procedure at room temperature, which is carried on until the desired oxidation is attained and undue viscosity of the fiber coating is substantially eliminated the material is ready for the compressing or molding into a commercially useful product. In carrying out this part of our procedure the compressing of the product with an interlocking of the fibers, uniformly distributed and without breaking and shortening of the fibers in the product, an internal-cam-roller type of press as disclosed in a copending application Serial Number 466,501, now Patent No. 2,412,299 issued December 10, 1946, is preferably used. The product thus produced may be aged for at least one week before final preparation for ultimate usage, such as calendering and placing in form for whatever the use the product is to be put.

At the time of final formation and treatment, particularly in a calendering procedure, the aged, compressed, body of the coated fibers is subjected to low temperature heat, i. e., to a temperature of sufficient degree for eliminating any solvent that remains after aging, but not high enough to "blister" or otherwise deleteriously affect the bonding coating of the fibers.

After the final constructive treatment to the finished product, the product may be subjected to any desirable or necessary final curing procedure or treatment.

An illustrative but non-limiting embodiment of an apparatus for disintegrating the preformed solid mass or billet of previously coated fibers is hereinafter described in conjunction with the accompanying drawings, in which:

Fig. 1 is a side view of the apparatus;

Fig. 2 is a top plan view;

Fig. 3 is an end view;

Fig. 4 is a fragmentary sectional view illustrating the adjustable positioning means for the motor and the defiberizing disintegrator element carried thereon;

Fig. 5 is a sectional detail view illustrating the mounting of the billet for its disintegration on the apparatus;

Fig. 6 is a face view of the face-plate to which the billet is supportedly attached in the forming procedure;

Fig. 7 is a face view of the rotating head of the apparatus, to which the billet-carrying face-plate is attachable;

Fig. 8 is a fragmentary view illustrative of a power-drive means for rotation of the billet;

Fig. 9 is a view illustrative of a modified support for the extended end portion of the billet; and, Fig. 10 illustrates a modification of the particle collector housing associated with the brush element.

Referring now to the drawings in detail, the parts of the machine having to do with the general broad inventive idea as to the disintegration of a preformed, compressed, mass or billet of coated fibers into discrete particles that are still in fibrous form in distinction from a granular or powdered form, will be first described. For this purpose, the machine comprises a rotatable holder 10 to which the billet-like preform B is attached, and a comparatively stiff, wire-bristled, rotary brush 11 which peripherally engages the preform B and causes disintegration of the preform as the brush and preform are moved the one relatively towards and across the other.

The effect of the coaction between the brush 11 and preform B is to break down the preform with a fine shredding or defiberation thereof and all of the discrete fibers have an appreciable coating of the bonding material thereon, so that, after oxidation and elimination of excess surface viscosity, the coated fibers are capable of being pressed into a compact solid body of a desired uniformity in the lay and bonding of the fibers.

For practical purposes the billet B is mounted in the defiberizing machine so as to be freely rotatable about a horizontal axis and means is provided for urging the billet longitudinally towards the rotary brush 11, such means being operated either manually or otherwise by an attendant, or else automatically, preferably the latter way as in the illustrative machine.

The brush element 11 is preferably motor-driven in its rotation about a horizontal axis which is in a plane below the axis of the billet B, but, as shown, the brush and motor are mounted as a unit on a manually manipulatable, reciprocatory carriage, so that the brush can be moved, at the will of the operator, back and forth across the abutting end of the billet as the billet is urged into contact with the periphery of the brush. In this way, the wire bristles of the brush effect a shredding disintegration or defiberization of the billet throughout the entire transverse area thereof, because of the relative difference in the axial planes of the brush and billet whereby the brush not only moves across the abutting end of the billet but causes the billet to rotate about its own axis on its support, first in one direction and then reversely, as the brush is moved beyond the opposite sides of a vertical line coincident with the axis of the billet.

As shown, the machine comprises a main body frame 12, at the top of which is a table bed 13. On this table bed the several parts of the machine are located and supported in their respective cooperative relationships.

The brush element 11 is located conveniently at an elevation above and adjacent one corner portion of the table bed 13 and its hub portion 14 is detachably secured in a conventional manner on the extended end portion 15 of the rotor shaft of a motor 16. The motor 16 is mounted on a rectangular carriage 17 having lateral corner extensions 18 that are fixedly secured at their outer ends on parallel supporting rods 19. The rods 19 are slidable longitudinally in supporting guide bearings 20 secured on top of the corner portions of a bed-plate 21 which, itself, is fastened on top of the underlying portion of the main table bed 13.

Fixedly secured to the underside of the carriage 17 is a lug 22 having a screw-threaded bore through which the threaded end portion 23 of an adjusting and holding screw 24 works. The screw 24 is mounted to rotate, but without longitudinal movement, in a bearing 25 that is secured on the main table bed 13 adjacent one side edge thereof (see Figs. 2 and 3). A hand-crank 26 is provided on the outer end of the screw 24.

By turning the hand-crank 26 in either direction the screw 24 is rotated accordingly; and, as the screw is held from longitudinal movement in the bearing 25 and its threaded portion 23 works in the screw-threaded bore of the lug 22 on the carriage 17, the carriage is shifted from one position to another on its supporting bearings 20, yet when the screw is not in motion it, because of its swivel mounting in the bearing 25, holds the carriage 17 in whatever position the same may be.

The rotatable holder 10 for the billet B, as shown, is in the form of a flat-faced, circular head, mounted on the end of a shaft 27 whose axis is at right angles to and in a horizontal plane above that of the axis of the brush element 11. The head 10, as shown in Fig. 7, is formed with apertures 28 to receive cap-screws 29 (see Fig. 5) whose threaded portions are screwed into registered, threaded, apertures 30 (see Fig. 6) that are provided in a circular face-plate 31, the billet B being attached firmly to and carried by this element 31 as best shown in Fig. 5.

The attachment of the billet B to the face-plate 31 may be effected in any practical manner, by a suitable adhesive, e. g., a thermoplastic or thermosetting material of the character of that with which the fibers in the billet are coated, or by any other suitable medium.

In practice, it has been found satisfactory to effect the attachment of the billet to the face-plate while the billet is being formed. For this purpose the face-plate 31 is provided with a multiplicity of apertures 32 in addition to the aforesaid screw-threaded apertures 30. Some of said additional apertures 32 are preferably of larger size than the apertures 30 (see Fig. 6), or they may be either of plain cylindrical bore, or threaded or otherwise undercut or formed interiorly so as to afford a substantial retentive interlocking of lug portions B¹ of the billet which are intruded and squeezed into said apertures 32, i. e., the face-plate 31 is placed in a mold and the mass of coated fibers to form the billet B is pressed against the plate with adhesion to the facial surface thereof augmented by the portions of the billet that are intruded in said apertures 32 of the plate (see Fig. 5).

The shaft 27 that carries the rotatable head 10 is journalled in bearings 33 on a rectangular carriage 34. This carriage has lateral corner extensions 35 which are fixedly secured to parallel carrier rods 36 mounted longitudinally slidable in supporting bearings 37 secured on top of an underlying rectangular bed plate 38, which latter, itself, is secured on top of a vertically adjustable table 39 superposed above the adjacent portion of the main table bed 13.

As shown (see Figs. 1, 2 and 3) the superposed table 39 comprises a substantial body plate, which may be and preferably is wooden, and is provided at its side edge portions with underlying, elongated, metal reinforcing and supporting members 40 of angle iron section, the vertical legs of said angle members 40 being disposed outwardly. The table 39 is located between corner supports 41, which, as shown (see Figs. 1 and 3), are channel iron sections of relatively short dimensions longitudinally of the machine but of considerable vertical proportions so as to support the table 39 at a substantial height above the main table base 13.

The members 41 have their bottom flanges 42 bolted or otherwise securely fastened to the main table base 13 and each member is provided with a pair of vertical slots 43. Bolts 44 are projected through these slots 43 from the vertical flanges of the marginal angle members 40 of the table 39 that abut said members 41, said bolts 44 having nuts 45 thereon with interposed washers 46 that are tightened against the members 41 to hold the table 39 in its vertically adjusted position on said members 41.

The carriage 34, mounted as it is to reciprocate in a direction at right angles to a vertical plane through the axis of the brush element 11, may be moved manually or otherwise towards and away from the brush element; but, as shown, means is provided to urge the carriage constantly towards said element, yet permitting movement (manual or otherwise) of the carriage away from the same, at will. This means consists of an elongated, flexible element, such as a chain, cord or cable 47, fastened at its opposite ends respectively to the projected ends of the pair of opposed corner extensions 35 located at the outer end of the carriage. From the places of attachment to the members 35 the flexible element 47 is carried forwardly over and back under peripherally grooved pulleys 48 mounted on the inner corner portions of the table 39, thence rearwardly beyond the carriage to similar pulleys 49 that are mounted on the outer end of the table. From the outer pulleys 49 the middle portion of the flexible element 47 is looped downwardly as at 50, and carries a gravitating weight 51 that is supported on said element 47 by a sheave 52 so as to be self-centering and hold the flexible element 47 constantly taut with an equalized pulling effect normally urging the carriage 34 towards the brush element 11. The gravitating weight 51 is made just heavy enough to move the carriage 34 and keep the carried billet B in contact with the brush element 11 without undue pressure but sufficiently for the disintegrating action of the brush upon the billet. In this way, the billet B is not only held against the brush element 11, but the carriage is easily movable in the direction away from the brush element, even by hand of the operator with minimum physical effort on his part.

In order to hold the carriage 34 in its outermost position away from the brush element 11 at any time it is so desired, especially during the time a billet B is being attached to the rotatable head 10 of the machine or while the face-plate 31 from which a billet has been stripped is being detached from said head or a new billet is being attached, a hook element 53 may be pivotally mounted on one of the guide bearings 37 and maintained normally in a raised position, as shown by full lines in Figs. 1, 2 and 3, but capable of being lowered at the will of the operator so as to engage the adjacent inner edge portion of the carriage as shown by dotted lines. This makes it unnecessary to provide any other special parts or devices for manipulating the carriage and holding it from movement by the power of the gravitating weight 51, although, if desired, in some machines such extra provision may be made within the purview of the invention.

In the operation of the machine, after the billet B is mounted as aforesaid, the defiberizing disintegration of the billet B is accomplished expeditiously. All the physical work to be performed by the operator is to turn the hand-crank 26 alternately in opposite directions so as to move the brush element 11 back and forth across the abutting end of the billet until the billet is entirely disintegrated. Sometimes, even this operation is eliminated, as the brush element may be left stationary in its working position. Then all the operator has to do is to retract the carriage 34 and engage the hook 53 or such other retaining device that may be provided. While the carriage is thus held retracted the removal of the stripped face-plate 31 and the substitution of another face-plate with a billet intact thereon is readily accomplished.

The discrete coated fibers removed from the billet B by the disintegrating action of the brush element 11 gravitate, assisted by the fanning effect of said element, through a hopper-opening 54 provided in the main table bed 13, whence they are collected in a suitable receptacle 55 placed beneath said hopper-opening as indicated conventionally in Fig. 1; or, if desired, the product of disintegration may be taken away from the machine by a conventional conveyor or the provision of a fan in conjunction with a cyclonic or other type of conventional particle collector. So, too, a suitable hood or housing shell (indicated schematically by the dotted lines 56 in Figs. 1 and 3) may be placed removably so as to enclose the brush element 11 and the billet B and thus confine the loose particles of disintegration during the operation of the machine. These provisions, in themselves, being conventional and as such not of the essence of the invention the same are not illustrated in detail in the drawings.

While the mountings of the billet B and the defiberizer brush element 11 are located off-center as to each other, i. e., the one is placed to rotate about an axis out of the plane of axis of the other, whereby the billet is caused to turn on its axis by the peripheral contact of the rotating brush element with the abutting end of the billet during reciprocatory movement of the brush element longitudinally along its axis, as hereinbefore described, suitable means may be provided for rotating the billet independently of the brush element. In this provision, although the axes of the billet and brush element should, for the purpose of the invention, still be at right angles or perpendicular to each other, or substantially so related, they need not necessarily be in substantially one and the same plane and the provided rotating means may be either operated manually or motor-driven, as desired, but preferably in the latter way.

An example of a motor-driven means is illustrated, more or less conventionally, in Fig. 8. As shown, a motor 57 is mounted on one of the bearings 33 of the billet-carrier shaft 27 and the rotor shaft of the motor has a driving pinion 58 fixed thereon. A spur gear 59 is splined, as at 60, on the shaft 27 so as to be moved into and out engagement with said pinion 58, at will, by any conventional shifting and holding means (not shown). When the gear 59 is in mesh with the pinion 58 the shaft 27 is rotated by power of the motor 57, but when the gear is disengaged from the pinion the shaft is rotatable free of the motor, either by hand of the operator or by the action of the brush element 11 as the latter is rotated in peripheral contact with and made to traverse the end and from beyond one side to the other of the axis of the billet B mounted on the shaft 27, as hereinbefore described. For manual operation of the shaft 27 its outer end may be formed as at 64 to receive a crank-handle 65.

In some, and, in fact, most instances in the use of the defiberizing machine of the present invention, the billet B may be of such balanced proportions as to length and diameter that it is self-sustaining throughout its entire extent from the attached face-plate 31. Hence, no extra support for the billet may be required. However, there may be times when it is desirable or necessary to defiberize billets of greater length in proportion to the diameter thereof, in which case, some substantial support may be needed adjacent the extended end of the billet to prevent breakage of the body rearward of the end thereof that is being subjected to the disintegrating action of the brush element 11. Such support may be in the form of a cylindrical sleeve 61 of slightly larger interior diameter than the billet so that the billet can be projected through the sleeve with freedom of longitudnal as well as rotative movement, yet afford a substantial support for the extended portion of the billet, as shown more clearly in Figs. 1 and 5. This supporting sleeve is mounted on a vertical standard 62 extending up from the table bed 13 and it is so proportioned and located at a distance from the carriage 34 to permit ample travel of the carriage to feed the entire billet through the sleeve until the billet is completely disintegrated by the action of the brush element 11 thereon.

Instead of the supporting sleeve 61, a plurality of rollers 63 (a pair thereof shown in Fig. 9 will usually suffice) may be located in an arcuate relation on the standard 62 and thus serve to support the extended end portion of the billet. In either form of support, breakage of a billet of considerable length is at least greatly minimized if not absolutely prevented, depending, of course, on the tenacity of the fiber bonding in the compressed body.

To limit the inward movement of the carriage 34 adjustable stop collars 66 are provided on the carrier-rods 36 so as to come against the forward bearing supports 37. In the regular use of the machine, particularly in instances where the face-plate 31 is made of a metal of such character that sparking is liable to occur when the same is struck by the wire bristles of the brush element 11, the stop collars 66 are set and fastened on the rods 36 in such position that the bearing supports 37 are contacted and the carriage arrested in its travel before the carried face-plate 31 is stripped entirely of the billet body. The leaving of some of the billet body intact on the face-plate does not detract from the coherence of a new body that is applied inasmuch as the new body constituting the billet is compressed with ample supporting cohesion upon the portion of the disintegrated body remaining on the face-plate. In instances, however, where the face-plate 31 is made of compressed fiber or a metal or other material that does not cause sparks when struck in quick succession by the wire bristles of the brush element 11, the face-plate can be brought into direct contact with the brush element and thus have its face stripped entirely of the billet body thereon. In this case, therefore, the stop-collars 66 need to be adjusted only to prevent over-travel of the carriage towards the brush element beyond any desired point without regard to prevention of contact with the brush element.

While in some uses of the machine a general housing enclosure 56 need only be provided, as hereinbefore described, a special housing 56A for the brush element 11 may be provided. As indicated in full lines in Fig. 2 and mainly in dotted lines in Figs. 1 and 3, this special housing, which surrounds only the brush element 11, is mounted, as at 67, 68 (see Fig. 3) so as to be supported by and movable with the motor 16 and its carriage 17.

At its opposite sides the housing 56A is provided with central openings 69, 70, to accommodate and clear the motor shaft 15 and the end nut and collar 71 that retains the brush element 11 on said shaft 15. This housing is preferably of a conventional spiral form as to its circumferential curvature, as in the ordinary fan type of blowers, i. e., the housing is eccentric with relation to the axis of the brush element, which latter, in this instance, constitutes the fan. In other words, the brush functions effectively as a fan as well as a disintegrator element in shredding the preformed billet B.

The housing 56A, as illustrated, is provided with a circumferential opening 72 adjacent the rotatably supported and longitudinally movable billet B (see Figs. 1 and 2) and through which opening the wire bristles work with ample clearance as to the edges of the opening but strike forcibly upon the end of the billet as held for its disintegration by the brush element.

A discharge opening 73 is located at the bottom of the housing 56A and it is extended, hopperlike, at 74, down close to the plane of the table base 13 and directly above the hopper opening 54. The periphery of the brush element 11 travels comparatively close to the opening 72 where the disintegration of the billet B occurs and in substantially the same close relation from said opening 72 to the discharge opening 73, but from said discharge opening 73 the circumferential wall of the housing is spread a considerably greater distance from the periphery of the brush element, as at 75, and thence receded to the aforesaid closer relation to the brush periphery. In this form of the housing 56A the outside air is drawn in through the central openings 69, 70, and the blast created by the rapidly rotating brush element and laden with the discrete, coated, fibers is discharged through the opening 73.

A satisfactory form and arrangement of fiber collector housing is illustrated in detail in Fig. 10. In this modification the circular portion housing 56B is concentric with the periphery of the brush element 11 and in close relation thereto. It is provided with an angular opening 76 of substantial size in its circumferential portion where the wire bristles of the brush come in disintegrating contact with the end of the billet B, said opening being the only place of substantial air intake, as the openings in the side walls of the housing are only made large enough to accommodate the motor shaft 15 and brush retaining nut 71.

The lower part of the opening 76 underlies the adjacent end portion of the billet B for a considerable distance, as at 76A, and it is in direct communication with a larger discharge opening 77 in the bottom of the housing, said opening 77 as shown being continued in an inclined boxlike or hopperlike formation 78 whose lower open end can be conveniently positioned in the machine for delivery of the product of disintegration to a suitable receiving container or conveyor, as the case may be.

This is an ideal form and arrangement of collector for the discrete coated fibers that are separated from the preformed billet by the brush element. It has proven practical and highly efficient and is generally preferred in the use of the machine. The advantage of this particular collector is its simplicity and the fact that air is drawn into the housing through the opening 76 as the brush element 11 is rotated and thus aids in the removal of the particles of disintegration from the billet, and the particles are thence carried in the stream of the airblast that expands in the larger outlet opening 77, whereby the discrete coated fibers are delivered from the housing in an ideal loosely separated condition.

The just above described housing provision for the brush element alone is an important feature of the machine of the present invention, in that it not only obviates the necessity for using the larger housing 56 which covers the billet B as well as the brush element 11, but it is of minimum size so as to be mounted to move with the motor 16 and the brush element 11, and in addition to functioning efficiently as a collector of the product of disintegration serves as a practical and effective guard for the rotating brush element, thus making for safety as well as efficiency in operation of the machine.

We claim:

1. A machine for disintegrating a preformed solid into discrete, coated fibrous particles, such machine comprising a motor-driven disintegrator brush rotatable about its axis and movable longitudinally along its axis of rotation, a holder for the said solid preform, said holder being rotatable about an axis at right angles to the axis of said disintegrator brush and movable longitudinally along its own axis, means normally acting to move said holder towards said disintegrator brush and maintaining the carried solid preform in contact with the same, releasable means for retaining the preform holder temporarily in a retracted position away from the disintegrator brush, means for effecting back and forth longitudinal movement of said disintegrator brush, and said preform holder having provision for its rotation during the disintegrating action of the brush upon the preform.

2. In a disintegrating machine of the kind described, a disintegrator brush element rotatable about its axis and movable longitudinally of its axis of rotation, a holder for a cylindrical solid preform of coated fibers to be defiberized in uniformly sized and coated fibrous particles, said holder being rotatable about an axis at right angles to the axis of said disintegrator brush and movable longitudinally along its own axis, means for moving said holder towards the disintegrator brush and maintaining said cylindrical preform in endwise contact with the same, means for rotating the brush and associated means for moving it transversely of the preform while such contact is maintained, and means extraneous of said holder for supporting rotatably the extended end or portion of said preform remote from said holder.

3. A machine for disintegrating into discrete, coated fibers, a compressed solid preform of fiber previously mixed with an organic bonding material, comprising a motor-driven disintegrating element rotatable about its axis of rotation and movable longitudinally along said axis, a holder for said solid preform, said holder being rotatable about an axis at right angles to the axis of rotation of said disintegrating element, means for moving said holder to maintain a surface of said preform normal to its axis of rotation in disintegrating contact with said disintegrator element, and means for moving said disintegrator element longitudinally along its axis of rotation while said element is in disintegrating contact with said normal surface of said preform.

4. A disintegrating machine for preparing a fibrous molding composition of discrete coated fibers from a solid preform of previously bonded fibrous material, comprising a rotatable disintegrator element movable longitudinally with respect to its axis of rotation, a rotatable holder for said preform, said holder being rotatable about an axis at right angles to the axis of rotation of said disintegrator element, means for positioning said holder to maintain a surface of said preform normal to its axis of rotation in disintegrating contact with said disintegrator element, and means for rotating said disintegrator element and associated means for moving it longitudinally while disintegrating contact with said normal surface of said preform is maintained.

5. In a disintegrating machine for preparing a fibrous molding composition of discrete, coated fibers from a solid preform of previously bonded fibrous material, a rotatable disintegrator element movable longitudinally with respect to its axis of rotation, means for mounting said preform for rotation on an axis at right angles to the axis of rotation of said disintegrator element with a surface of said preform normal to its axis of rotation disposed to be traversed by said disintegrator element when said element is moved longitudinally in disintegrating contact with said perform, and associated means for maintaining said preform in disintegrating contact with said disintegrator element under constant pressure.

6. In a disintegrating machine for preparing a fibrous molding composition of discrete, coated fibers from a solid preform of previously bonded fibrous material, a rotatable disintegrator element, means for mounting said preform for rotation on an axis at right angles to the axis of rotation of said disintegrator element, means associated with said preform mounting means for maintaining a surface of said preform normal to its axis of rotation in disintegrating contact with said disintegrator element, means for rotating said disintegrator element and associated means for moving said element longitudinally along its axis of rotation in disintegrating contact with said preform, whereby said preform is rotated by disintegrating contact with said disintegrator element to effect a shredding disintegration of said preform.

HOWARD SNOW.
RUDOLPH H. HOCUTT.

REFERENCES CITED

The following references are of record in the file of this patent:

UNITED STATES PATENTS

| Number | Name | Date |
|---|---|---|
| 359,156 | Jackson | Mar. 8, 1887 |
| 551,677 | Jaeger | Dec. 17, 1895 |
| 1,358,394 | Redman et al. | Nov. 9, 1920 |
| 1,785,391 | Russell | Dec. 16, 1930 |
| 1,890,424 | Whitworth | Dec. 6, 1932 |
| 1,925,550 | Williams | Sept. 5, 1933 |
| 1,944,271 | Riedling | Jan. 23, 1934 |
| 2,273,770 | Nanfeldt | Feb. 17, 1942 |
| 2,283,005 | Godfrey | May 12, 1942 |
| 2,293,590 | Chance | Aug. 18, 1942 |
| 2,309,342 | Dent et al. | Jan. 26, 1943 |
| 2,321,936 | Pollock | June 15, 1943 |

FOREIGN PATENTS

| Number | Country | Date |
|---|---|---|
| 319,449 | Great Britain | Sept. 26, 1929 |
| 495,472 | Great Britain | Feb. 10, 1937 |